Oct. 12, 1965     A. T. PURDOM     3,210,882
FISHING LURE
Filed Jan. 8, 1964
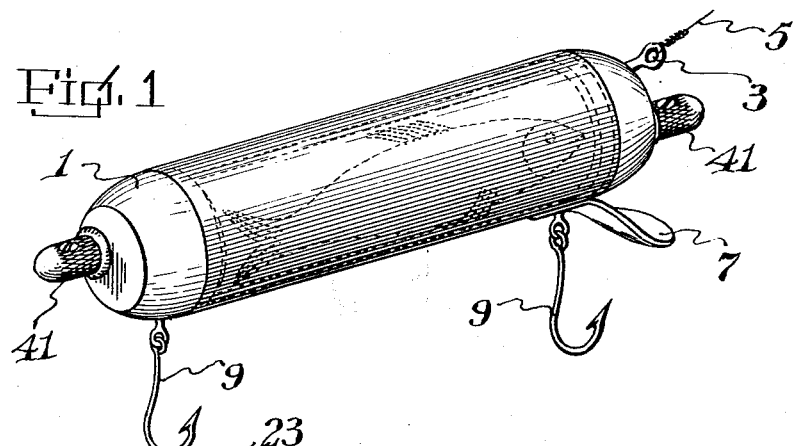
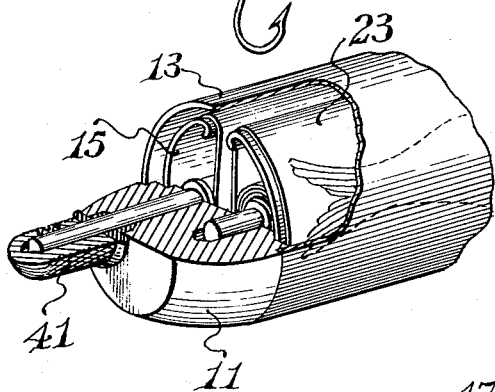
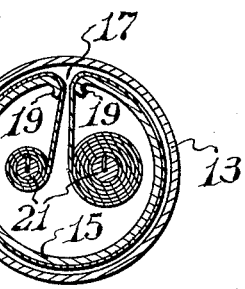
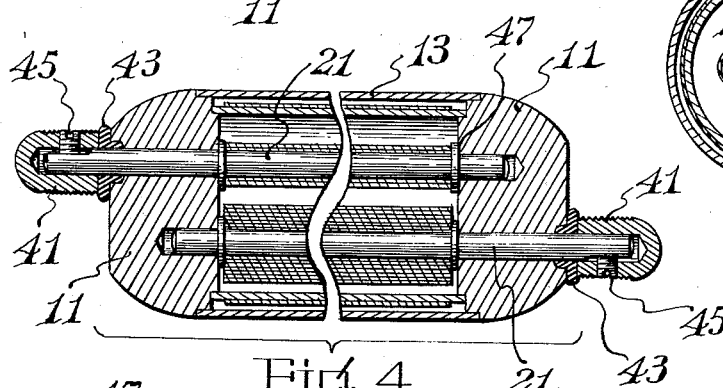
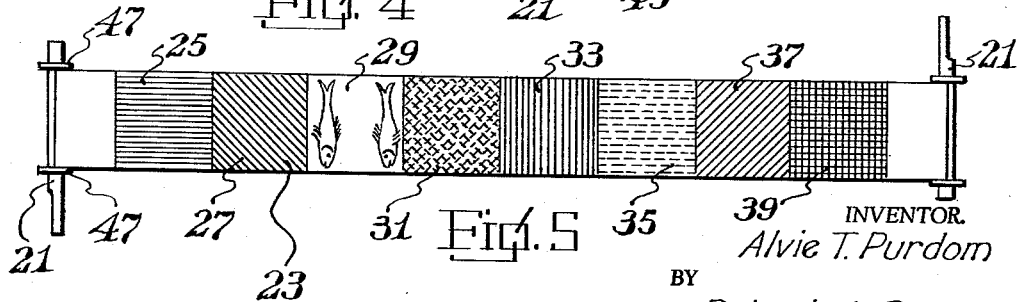
INVENTOR.
Alvie T. Purdom
BY
Robert J. Patch
ATTY.

United States Patent Office 3,210,882
Patented Oct. 12, 1965

3,210,882
FISHING LURE
Alvie T. Purdom, 4941 S. Lawton Ave., Tulsa, Okla.
Filed Jan. 8, 1964, Ser. No. 336,488
1 Claim. (Cl. 43—42.33)

The present invention relates to a fishing lure, more particularly of the type including changeable indicia for varying the appearance of the lure.

It is an object of the present invention to provide a fishing lure of the changeable indicia type adapted to present any of a plurality of desired appearances to the fish to be caught.

Another object of the present invention is the provision of a fishing lure of the changeable indicia type which will be waterproof.

Still another object of the present invention is the provision of a fishing lure of the changeable indicia characterized in that the changeable indicia occupy a desirably large proportion of the available surface of the lure.

Finally, it is an object of the present invention to provide a fishing lure of the changeable indicia type, which will be relatively simple and inexpensive to manufacture, easy to operate, and rugged and durable in use.

Other objects and advangtages of the present invention will become apparent from a consideration of the following description, taken in connection with the accompanying drawing, in which:

FIGURE 1 is a perspective view of a fishing lure according to the present invention;

FIGURE 2 is an enlarged fragment of FIGURE 1 with parts broken away to show internal structure of the lure;

FIGURE 3 is a transverse cross sectional view of the fishing lure;

FIGURE 4 is an elevational cross sectional view of the fishing lure with parts broken away for consolidation; and FIGURE 5 is a view of the unrolled indicia strip showing the various indicia that can be exposed to view.

Referring now to the drawing in greater detail, there is shown a fishing lure comprising a body 1 having an eye 3 embedded therein at its forward end for the reception of a line 5 by which the lure is drawn through the water. A spoon or fin 7 at the forward end of the body is downwardly declined so as to cause the lure to dive. The usual hooks 9 are swingably connected to the forward and rear ends of the body.

The body is comprised of a pair of end members 11 which may be of any desired material such as wood or transparent plastic. An outer cylindrical transparent sleeve 13, which is preferably of plastic but may also be of glass, is flush on its outer side with the outer surface of end members 11 and spaces end members 11 apart and is secured in a water-tight joint at each of its ends to an end member 11 that fits a short distance within each end of sleeve 13.

Body 1 also includes an inner support sleeve 15 which is of generally cylindrical configuration concentric with and spaced within transparent sleeve 13. Inner support sleeve 15, however, is not a complete cylinder but rather has end edges that are spaced apart by a straight slot 17 parallel to the length of body 1. The edges 19 of slot 17 are rounded inwardly to provide smooth opposed slot edges.

Mounted for rotation within body 1 is a pair of rolls 21 parallel to each other and to the axis of body 1. One roll 21 extends entirely through and extends beyond one end member 11 and extends only partly through and is journaled in the other end member 11. The other roll 21 extends all the way through that other end member 11 and terminates a distance outwardly beyond it and is journaled for rotation therein. In other words, rolls 21 extend endwise outwardly beyond body 1 in opposite directions and are both mounted for rotation about their axes on body 1 and both bridge entirely the gap between end members 11.

A flexible strip 23 is wound in opposite directions on rolls 21. Strip 23 may be of flexible plastic, rubber, cloth, or other durable flexible material. Strip 23 extends from one roll 21, through slot 17 and almost entirely about the periphery of inner support sleeve 15, back through slot 17 and about the other roll 21. Strip 23 thus has an outer surface that is visible through transparent sleeve 13. That outer surface of strip 23 is provided with a plurality of indicia that differs from each other lengthwise of the strip. In the embodiment illustrated in FIGURE 5, for example, the indicia comprise, in series, a blue panel 25, a green panel 27, a panel 29 showing fish, an orange panel 31, a red or pink panel 33, a grey or silver panel 35, a brown panel 37 and a black panel 39.

The ends of rolls 21 that extend endwise beyond their respective end members 11 are provided with generally cylindrical roughened-surface finger pieces 41. Each finger piece 41 compresses an elastic deformable seal 43, such as a rubber seal, between itself and the adjacent end member 11. A set screw 45 assures that finger piece 41 cannot move endwise outwardly on its associated roll 21, while a pair of flanges 47 in unitary assembly with each roll 21 and in slidable contact with opposed inner surfaces of end members 11 assures that the resiliency of seal 43 will not move roll 21 axially outwardly of its intended position. Outer transparent sleeve 13 and seals 43 thus assure that the interior of the lure will remain dry despite long immersion in water. Although it is preferred that the lure be waterproof, it is not essential that it be waterproof. But waterproofness is preferred because it lends controlled buoyancy to the lure and preserves the lure and the high visibility of the indicia.

In use, finger pieces 41 are manipulated to roll strip 23 in one direction or the other so as to change the nature of the exposed panel according to the indicium the fisherman wishes to present to the fish. Ordinarily, winding both finger pieces 41 at the same angular velocity will not maintain the strip 23 taut on rolls 21, as the outer diameter of the strip on rolls 21 will ordinarily be different depending upon how much strip 23 is wound on each roll 21. Therefore, one convenient way of changing the indicia is simply to turn one finger piece 41 so as to roll up the strip on the associated roll 21, and at the same time to pull the strip off and turn the other roll 21. The location of the finger pieces at opposite ends of the lure assures that they will not interfere with each other when turned.

From a consideration of the foregoing disclosure, therefore, it will be evident that all of the initially recited objcts of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claim.

I claim:

A buoyant fishing lure comprising a body having line attaching means at one end, a fishhook carried by the body, transparent sleeve means encompassing a midportion of the body, a support sleeve within the transparent sleeve means, a flexible member bearing indicia and encompassing the support sleeve, and means for storing in the support sleeve indicia other than the indicia encompassing the support sleeve, said storage means comprising means for rolling and unrolling both ends of the flexible member within the support sleeve, said last named means extending from opposite ends of said lure.

References Cited by the Examiner

UNITED STATES PATENTS

| | | | |
|---|---|---|---|
| 2,021,934 | 11/35 | Dull | 40—86 |
| 2,270,487 | 1/42 | Withey | 43—42.39 X |
| 2,884,732 | 5/59 | Bailer | 42—42.33 |
| 2,928,196 | 3/60 | King | 40—86 |
| 3,069,801 | 12/62 | Mills | 43—42.33 |

ABRAHAM G. STONE, *Primary Examiner.*